United States Patent [19]
Niibe et al.

[11] Patent Number: 5,528,654
[45] Date of Patent: Jun. 18, 1996

[54] MULTILAYER FILM FOR X-RAYS

[75] Inventors: Masahito Niibe, Atsugi; Yasuaki Fukuda, Hadano, both of Japan

[73] Assignee: Canon Kabushiki Kaisha, Tokyo, Japan

[21] Appl. No.: 258,071

[22] Filed: Jun. 10, 1994

[30] Foreign Application Priority Data

Jun. 14, 1993 [JP] Japan .................................. 5-142295

[51] Int. Cl.$^6$ .................................................. G21K 1/06
[52] U.S. Cl. .................................................. 378/84; 378/85
[58] Field of Search ................................ 378/84, 85, 34, 378/35, 145

[56] References Cited

U.S. PATENT DOCUMENTS

| | | | |
|---|---|---|---|
| 5,216,539 | 6/1993 | Boher et al. | 378/34 |
| 5,310,603 | 5/1994 | Fukuda et al. | 428/446 |

OTHER PUBLICATIONS

Fabrication and Evaluation of Cr–C Multilayer Mirrors for Soft X–Rays, M. Niibe et al., vol. 1720, pp. 208–216, 1992.
Journal of Applied Physics, Aug. 1, 1990, P. Ruterana et al., vol. 68, pp. 1033–1037, Aug. 1, 1990, "A Transmission Electron Microscopy Study of Low–Temperature Reaction at the Co–Si Interface." Applied Optics, J. H. Underwood et al., vol. 20, No. 17, Sep. 1, 1981, "Layered Synthetic Microstructures as Bragg Diffractors for X–Rays and Extreme Ultraviolet: Theory and Predicted Performance."

*Primary Examiner*—Don Wong
*Attorney, Agent, or Firm*—Fitzpatrick, Cella, Harper & Scinto

[57] ABSTRACT

A multilayer film for X-rays comprising two kinds of films having different refractive indices, deposited alternately, wherein one of said two kinds of films which has smaller refractive index consists of an alloy containing Co and Cr. The multilayer film is capable of being utilized as an optical element such as a reflection mirror or a reflection-type X-ray mask.

20 Claims, 9 Drawing Sheets

MULTILAYER FILM FOR X-RAYS

BACKGROUND OF THE INVENTION

This invention relates to a multilayer mirror for soft X-rays, widely used in a scientific instrument or a manufacturing apparatus, such as an optical element of beam line of a synchrotron radiation, an X-ray microscope, and an X-ray exposure apparatus. Particularly, it relates to a multilayer mirror capable of being used even in a case of a normal incidence in which an incident angle is practically perpendicular to the mirror surface.

Generally, in almost all materials, refractive indices are substantially equal to one to a light having a shorter wavelength, as for example, the so-called vacuum ultraviolet light, and the absorption coefficients are more than negligible. As a result, a conventional reflection mirror fails to function properly.

In recent years, a method for depositing a multilayer film while controlling the thickness of each layer of a large number of thin films of the order of angstrom has been developed. By using that method, multilayer films have been proposed in which each reflecting light from each of a plurality of layer interfaces constructively interfere each other, and they are currently under active research and development.

In general, the multilayer mirror consists of a multilayer film in which tens to hundreds of thin-films made of different materials are deposited alternately. In order to obtain a high reflectivity, a combination of materials of the thin films must be selected so that a difference between the refractive indices of the materials adjacent to each other is as large as possible. A well-known rough criterion for selecting the combination of the materials is a material mainly consisting of a heavy element and a material consisting mainly of a light element.

Up to the present, the combinations of materials of the thin films consisting mainly of a heavy element such as silver (Ag), nickel (Ni), or cobalt (Co), and materials of a thin film mainly consisting of a light element such as carbon (C) and boron (B) are known in the cases in which the soft X-ray has a wavelength of around 100 Å or less.

Co is particularly suitable for the material of the multilayer film for reflecting the light having a wavelength of 100 Å or less because of a large difference in the refractive index between Co and the refractive index of a light element, and its relatively small absorption coefficient.

However, as reported by P. Ruterana (J. Appl. Pys., Vol. 68, p. 1033, 1990), when Co is formed into a thin film of 30 Å or less, condensation of the material occurs. Accordingly, a uniform and continuous thin films cannot be obtained. As a result, in a multilayer film with a thickness of 30 Å or less having Co thin film as a layer having smaller refractive index, the Co layers are formed in an island-like condition. This condition causes an increase in the roughness of the layer interfaces of the multilayer film and further increase of scattering of X-rays. Thus, the reflectivity of the multilayer film reduced, to the extent that, in a serious case, almost no reflection occurs.

SUMMARY OF THE INVENTION

An object of the present invention is to provide a multilayer film for X-rays of short-period, having high reflectivity, by forming a multilayer film consisting of a uniform and continuous thin films while suppressing the condensation of the materials, even in a case of, for example, a thin film of Co having a thickness of 30 Å or less.

One aspect of the present invention is for a multilayer film for X-rays comprising a substrate; a multilayer of thin films for X-rays on said substrate, with each such layer comprising first and second types of thin films, with each thin film having a different refractive index; the second thin film being deposited on the first thin film, wherein, one of the first and second types of thin film has a smaller refractive index than the other thin film, and consists of an alloy containing Co and Cr.

In another aspect of the invention an optical element for X-rays, comprises a substrate; a multilayer of thin films for X-rays on said substrate, with each such layer comprising first and second types of thin films, with each thin film having a different refractive index; the second thin film being deposited on the first thin film, wherein, one of the first and second types of thin film has a smaller refractive index than the other thin film, and consists of an alloy containing Co and Cr.

According to a further aspect of the present invention an X-ray exposure apparatus comprises an optical system including an optical element for exposing an object with X-rays, said optical element comprising a a substrate; a multilayer of thin film for X-rays on said substrate, with each such layer comprising first and second types of thin films, with each thin film having a different refractive index; the second thin film being deposited on the first thin film, wherein, one of the first and second types of thin film has a smaller refractive index than the other thin film, and consists of an alloy containing Co and Cr.

According to yet another aspect of the invention a method of manufacturing a micro-device, comprises the steps of providing an X-ray optical system including an optical element; said optical element being formed by forming a multilayer of thin films for X-rays on said substrate, with each such layer comprising first and second types of thin films, with each thin film having a different refractive index; wherein one of the first and second types of thin film having a smaller refractive index than the other thin film consists of an alloy containing Co and Cr. Depositing said second thin film on said first thin film; providing a mask having a pattern and a wafer; exposing the mask and the wafer to transfer the pattern of the mask onto the wafer by using said X-ray optical system.

The present invention comprises, in a multilayer film for X-rays in which two types of thin films having different refractive indices and respective selected thicknesses are deposited alternately to form said multilayer film. The thin films having the smaller refractive index consist mainly of an alloy of Co and chromium (Cr), said alloy being expressed by the componential formula $Co_xCr_{1-x}$, where, X is a number from 0.3 to 0.8 indicating the mole fraction of Co in the formula.

DETAILED DESCRIPTION OF THE PREFERRED EMBODIMENTS

The inventors of the present invention discovered and reported that Cr is capable of forming a uniform and continuous thin film having a thickness of around 10 Å without condensation (Proc. SPIE Vol. 1720, p 208, 1992).

As evident from the above, Cr is one of the materials suitable for the multilayer film of which high reflectivity can be expected for a light of shorter wavelength.

However, when optical constants of each of Cr and Co to a light of wavelength 100 Å or less are compared, (Henke et al. At. Data Nucl. Data Tables, Vol. 27, p. 1, 1982), Co exhibits greater differences in the refractive index from that of various materials having larger refractive indices, that is, light elements, than the difference that Cr shows. Thus, if a uniform and continuous Co thin film having a thickness 30 Å or less can be formed, the formed multilayer ought to have higher reflectivity than that of a multilayer film using the thin film of Cr.

Figure 2:
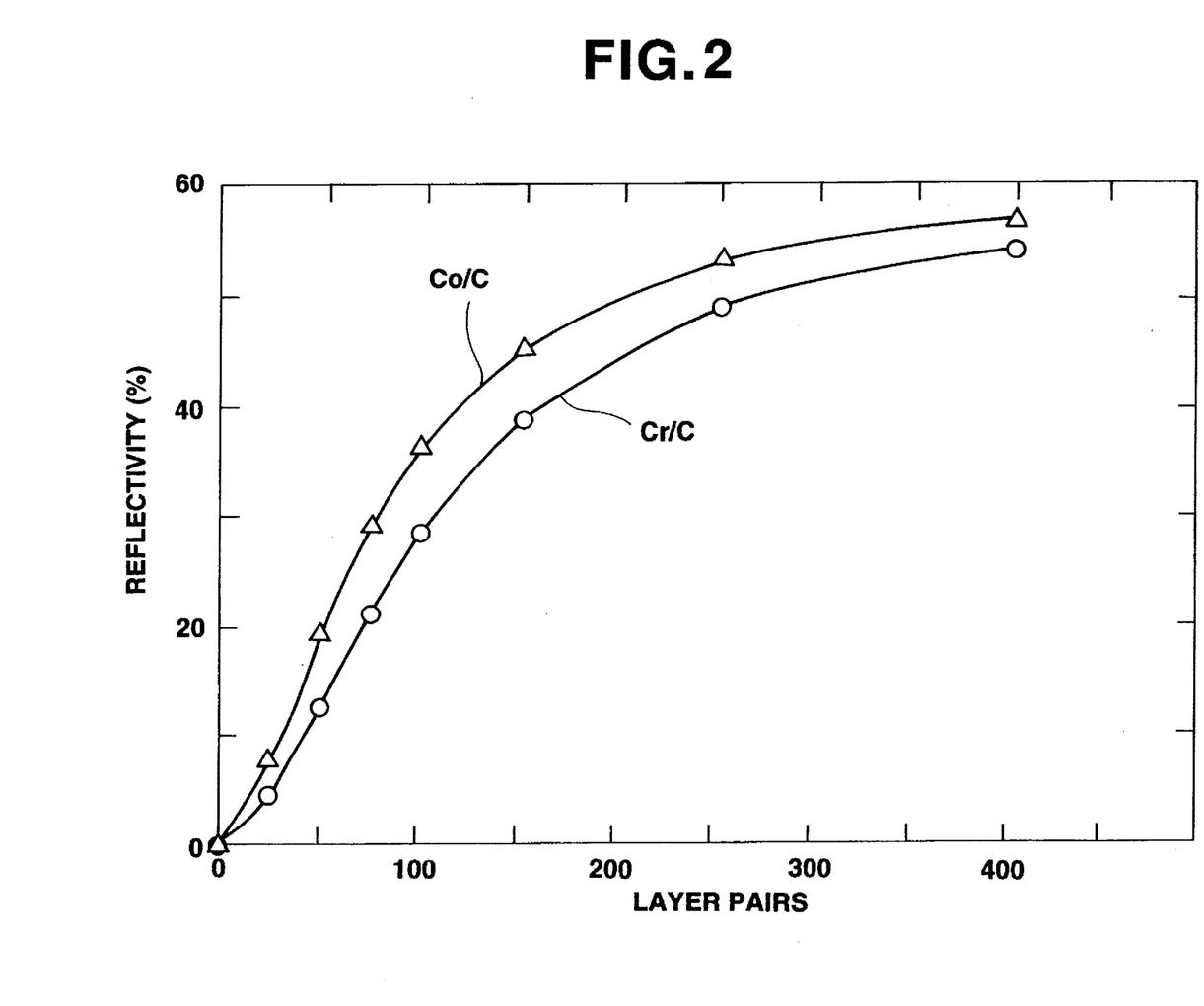
FIG. 2 is a graph illustrating the relationship between the reflectivity and the number of layer pairs in the optimized multilayer film having a combination of Co/C and Cr/C, respectively.

FIG. 2 illustrates, for example, variations of reflectivity calculated in accordance with the number of layers i.e. the number of layer pairs. The readings show the dependence of the reflectivity on the number of layers in the multilayer films in which the combination of materials are Co/C and Cr/C, respectively, optimized in a case of a wavelength of 45 Å.

As shown in FIG. 2, the reflectivity of the Co/C multilayer film is greater than that of the multilayer film of Cr/C when both multilayers have the same number of layers. Moreover, in order to obtain the same reflectivity, the Co/C multilayer needs a lesser number of layers. It means that Co/C multilayer film has the following advantages as well as being easier to produce.

Generally, in a multilayer film, the range of the wavelength which can be reflected is limited within a band width determined in accordance with the structure of the multilayer film. The band width is in approximately inverse proportion to the number of layers of the multilayer film. In other words, the band width narrows in accordance with the increasing of the number of layers. Therefore, if the multilayer film can be formed with the smaller number of layers, the multilayer film has a greater integral reflectivity to the incident light. A multilayer film with a greater integral reflectivity has the effect of improving efficiency of an optical apparatus using the multilayer film, as for example, increasing of throughput of an X-ray exposure apparatus.

The inventors of the present invention succeeded in producing a multilayer film with high optical quality in which the layer structure is uniform and continuous. And in suppressing condensation of the material even with a thickness of 30 Å or less, by using an alloy of Co having excellent optical constants and Cr having excellent interfacial smoothness, as a material of thin film having lower refractive index in the multilayer.

Further, the inventors of the present invention have found that, uniform and continuous layers consisting of CoCr can be formed when a mole fraction of Co is under 0.8 or less as a component of the alloy. Moreover, the inventors of the present invention have found that in order to obtain high reflectivity, the mole fraction of Co should be over 0.3 as the component of the above alloy.

In summation, the multilayer film for X-rays is most effective when CoCr alloy is used as a material for the thin film having smaller refractive index and having the formula $Co_xCr_{1-x}$, where, x is within 0.3–0.8.

It is needless to say that not only an alloy of Co and Cr but also the thin film may also consist of three or more elements in the above formula, and be equally efficient.

As the material for the thin layer having the higher refractive index with which the layer having the lower refractive index is combined in the multilayer film, where the CoCr alloy is used as the layer having lower refractive index in the present invention, various elements can be selected in accordance with the wavelengths. In Table 1, preferable examples of the elements and compounds of the elements are shown.

TABLE 1

| Range of wavelength (Å) | Elements |
| --- | --- |
| –24 | Ba, Mg, Be |
| 24–32 | Sb, Ba, V, Te, Mg, Be |
| 32–36 | Sc, Ba, Mg, Be, Ti |
| 36–44 | Ca, Ba, Sc, Be, Mg |
| 44–66 | C, Ca, Ba, Sc |
| 66–100 | B, Ca, Zr, Sc, Ba, C |

Table 2 shows examples of the calculated reflectivity of the multilayer film prepared under the optimized condition from materials containing elements in Table 1 in various wavelengths, with respect to several combinations of the materials. The reflectivity was calculated by a generally known method on the basis of Fresnel's reflection law which is generally known (for example, J. H. Underwood et al. Appl. Opt, Vol. 20, p 3027, 1981). Here, S-polarized reflectivity is calculated based on the number of layer pairs being 100, and perpendicular incident angle to the multilayer film.

TABLE 2

| Wavelength (Å) | Combination of materials | $d_{CoCr}$ (A) | $d_B$ (A) | Reflectivity (%) |
| --- | --- | --- | --- | --- |
| 25 | CoCr/V | 6.14 | 6.39 | 4.7 |
| 32 | CoCr/Sc | 7.46 | 8.58 | 17.6 |
| 40 | CoCr/CaF$_2$ | 8.83 | 11.28 | 14.2 |
| 70 | CoCr/B$_4$ | 10.33 | 24.93 | 37.4 | where, $d_{CoCr}$: thickness of CoCr thin film $d_B$: thickness of the thin film having the higher refractive index The present invention will now be described in detail with reference to the following examples and related Figures.

Example of a multilayer mirror

Figure 1:
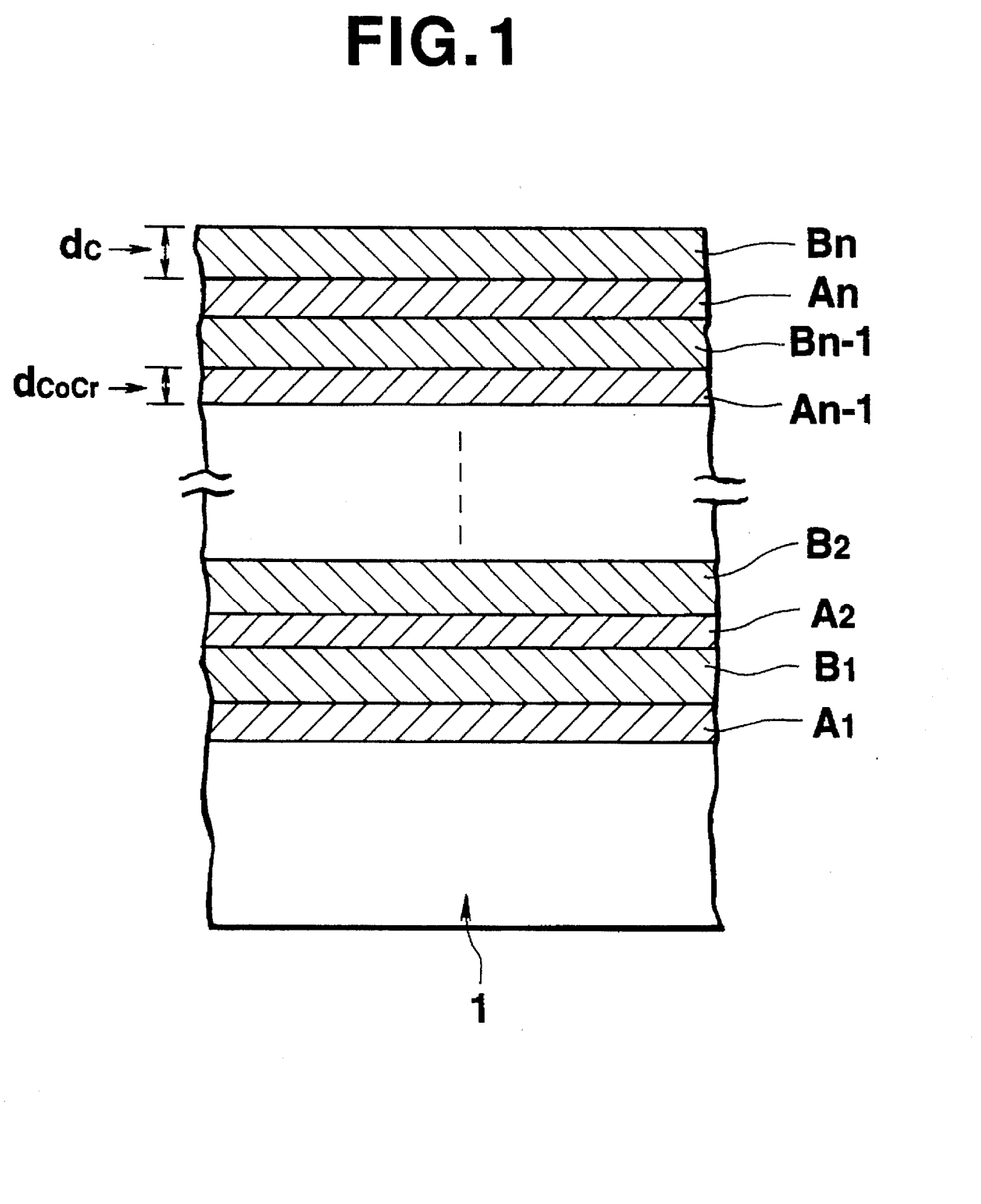
FIG. 1 is a sectional view of a preferred embodiment of a multilayer film for soft X-rays of the present invention.

FIG. 1 is a sectional view of a main part of a preferred embodiment of a multilayer mirror according to the present invention.

The multilayer film for soft X-rays has a structure in which thin films $A_1$–$A_n$ in which material having the lower refractive index consist of an alloy of CoCr, and thin films $B_1$–$B_n$ in which the material having the higher refractive index consist of C are alternately formed on substrate 1.

Here, the surface of substrate 1 on which the multilayer film is formed is processed to be sufficiently smooth with respect to a wavelength of the soft X-rays in order to prevent scattering of the soft X-rays on substrate 1.

Thicknesses of each CoCr thin film and each C thin film are set at the value calculated on the basis of said Fresnel's reflection law for obtaining higher reflectivity. For example, when the Co/Cr alloy has the component $Co_{0.5}Cr_{0.5}$, and the number of layer pairs are 100, they are set so that $d_{CoCr}$=9.36 Å, $d_c$=15.79 Å in order to reflect a soft X-ray having a wavelength of 50 Å at a perpendicular incident angle to the multilayer film.

Next, the process for producing the multilayer film illustrated in FIG. 1 will be explained.

The multilayer film was produced by using a magnetron sputtering method, which is well known.

Initially, substrate 1 made from quartz was set in a substrate holder rotatable in a vacuum chamber.

After the vacuum chamber was evacuated to vacuum degree of 5E-7 Torr, argon gas was introduced to the vacuum chamber so that the pressure within the chamber was 0.5 mTorr.

Then, each thin film of Co/Cr alloy of $A_1$–$A_n$ and each carbon thin film of $B_1$–$B_n$ was deposited alternately on the substrate by electric discharge on targets of CoCr alloy and carbon (C) respectively. The thickness $d_{CoCr}$ of each of the CoCr alloy thin film and the thickness $d_c$ of each of C thin film were monitored by a quartz oscillator.

The quantity of deposition was controlled by a deposition shutter. Upon sputtering, the deposition speed of CoCr alloy was 0.4 Å/sec, and the deposition speed of carbon was 0.3 Å/sec. The component of the alloy in CoCr thin film of the resultant multilayer film was analyzed by Auger electron spectroscopy (AES). And it was observed to correspond with the component of the CoCr alloy of the target within experimental error.

Figure 3:
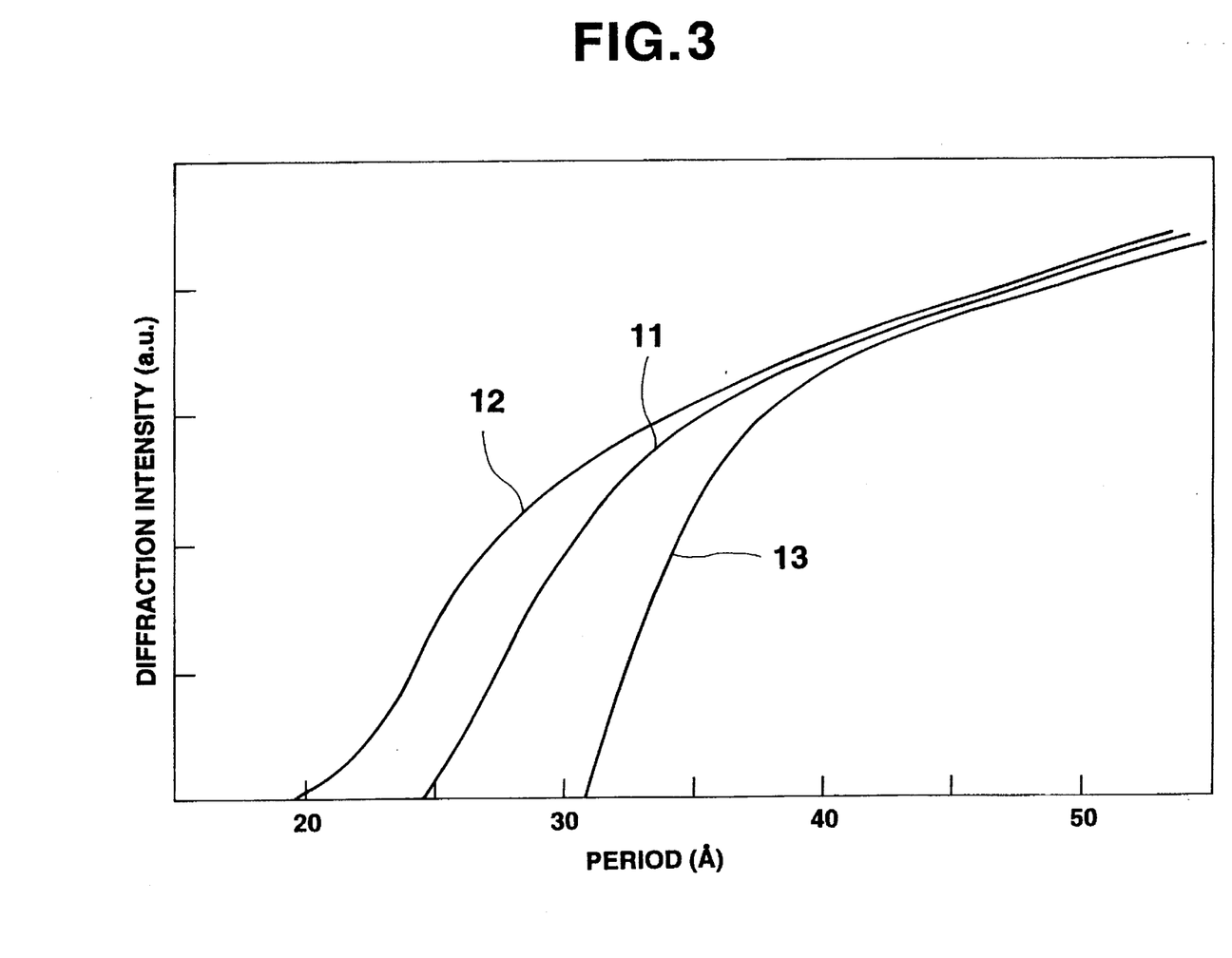
FIG. 3 is a graph illustrating the relationship between the period and diffraction intensity of X-rays in multilayer films of CoCr/C of the present invention and a multilayer film of Co/C in an prior art.

The multilayer film of CoCr/C produced as above was evaluated in the periodicity and the diffraction intensity by small angle diffraction of X-rays of wavelength 1.54 Å. FIG. 3 illustrates the results of the experiment. Here, the abscissa represents a period of each of the produced various multilayer films, and the ordinate axis represents a peak intensity of primary Bragg diffraction by the multilayer film. Curves 11 and 12 represent the diffraction intensities of the multilayer film produced with an alloy of composition $Co_{0.8}Cr_{0.2}$, and $Co_{0.5}Cr_{0.5}$, respectively.

For comparison to the above results, FIG. 3 shows curve 13 of the measured values in the multilayer film of Co/C prepared in the same manner as above.

Curve 13 shows that in the Co/C multilayer film, the diffraction intensity reduces more steeply when the period is shorter than 40 Å, and when the period is under 31 Å, the diffraction intensity was nearly zero. A cross section of the Co/C multilayer film having a period shorter than 40 Å was observed by a transmission electron microscope of high resolving power. It was observed that desolation occurred in the layers of Co to form an island-like condition and the layers were not formed continuously.

In contrast, as shown by curve 11, in the multilayer film using an alloy with component $Co_{0.8}Cr_{0.2}$, prepared by adding 20 mole % Cr to Co, as a target, the diffraction intensity at a short period was remarkably improved, and the diffraction intensity was observed up to the period of 25 Å.

Moreover, curve 12 shows that in the multilayer film using an alloy with component $Co_{0.5}Cr_{0.5}$ prepared by adding 50 mole % Cr to Co as a target, the diffraction intensity in shorter period was further improved, the characteristics of which are by no means inferior to those of the Cr/C multilayer film.

Then, the reflectivity of the multilayer films prepared as above to the soft X-ray region was evaluated. A synchrotron radiation was used as a light source of the soft X-rays. Reflectivity of the multilayer film to the monochromatic soft X-rays of wavelengths 20–120 Å was evaluated by obtaining spectra by a diffraction grating monochromater.

The soft X-rays were incident with an incident angle 10° to the multilayer films, and the reflectivity was calculated on the basis of the ratio of the intensity of the soft X-rays reflected from the multilayer film to the intensity of the incident soft X-rays.

Figure 4:
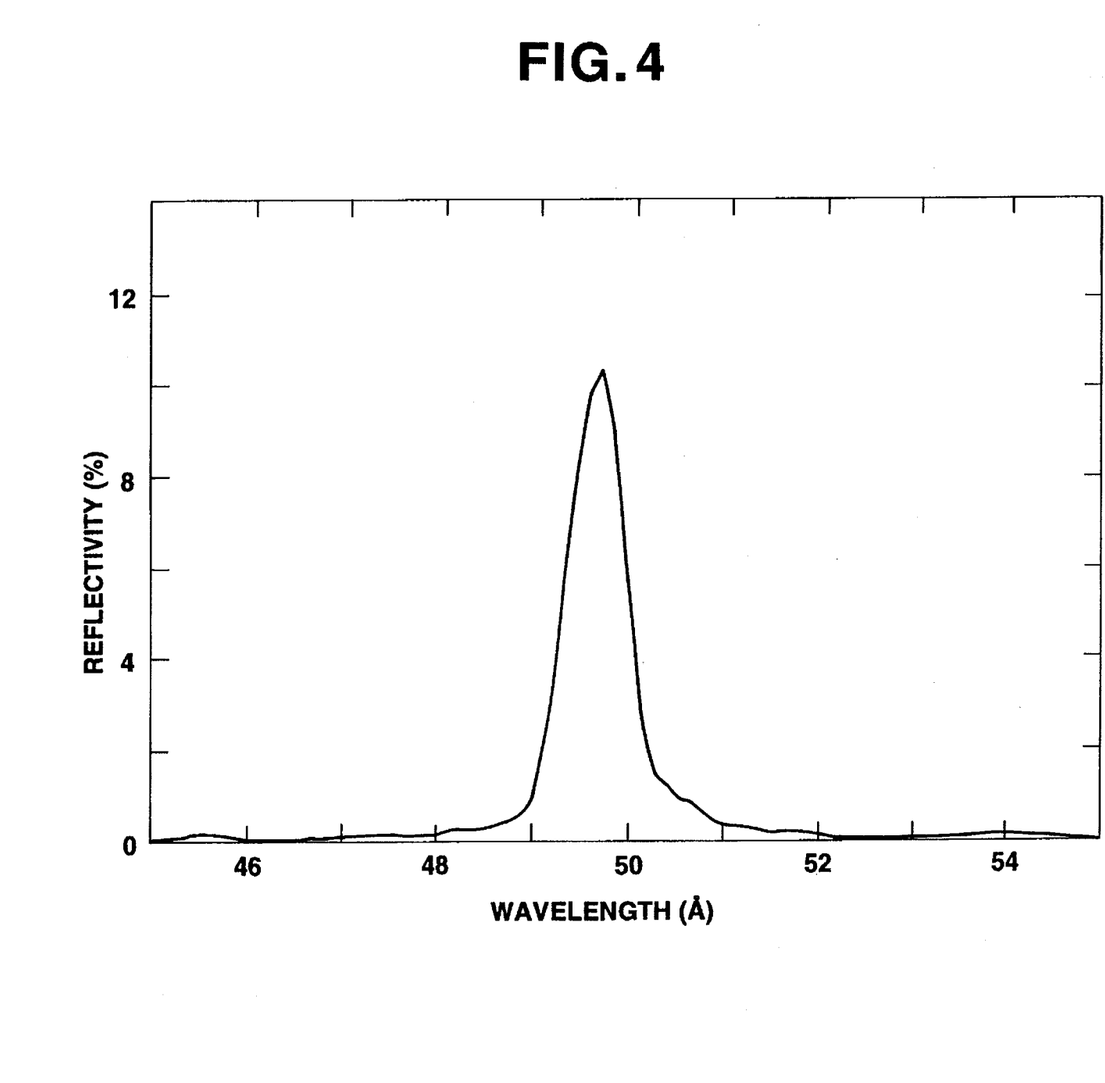
FIG. 4 is a graph illustrating the wavelength dependence of the reflectivity of a multilayer film of the present invention for soft X-ray.

The wavelength dependence of the reflectivity measured as above was shown in FIG. 4. The multilayer film shown in FIG. 4 was formed using an alloy with the component $Co_{0.5}Cr_{0.5}$ as a target for the thin film having lower refractive index, in which the thickness of CoCr thin film $d_{CoCr}$= 9.4 Å, the thickness of C thin film $d_c$=16.3 Å, and the number of the layer pairs was 100. A peak of the reflection intensity was observed when the wavelength was near 50 Å, and the peak reflection intensity was 10.2%.

Figure 5:
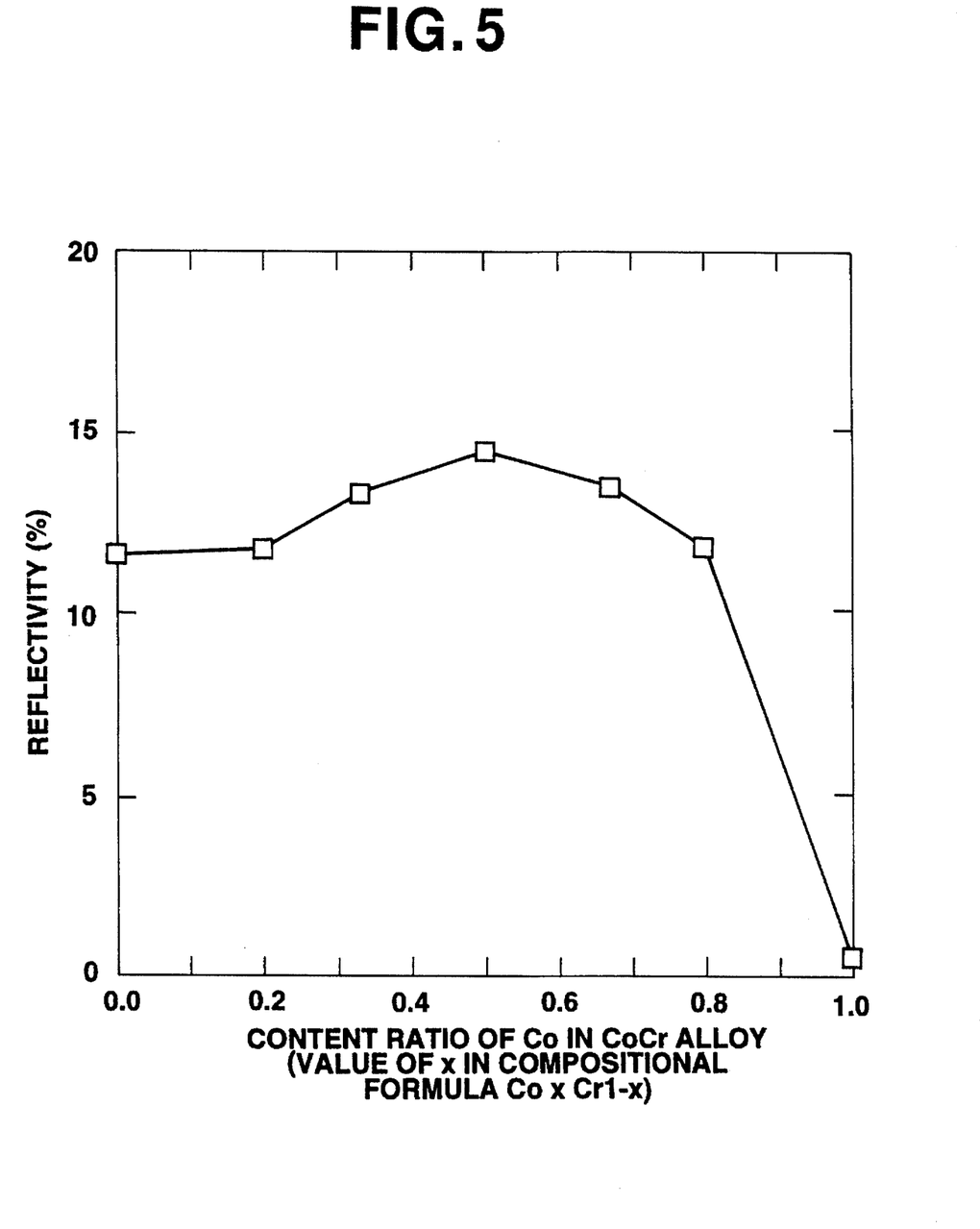
FIG. 5 is a graph illustrating the relationship between the reflectivity of a multilayer film of the present invention and the component ratio of CoCr layer.

With respect to a CoCr/C multilayer film having 100 layer pairs in which the peak of the reflection intensity exists at the wavelength near 60 Å, peak values of the reflectivity in various components of the CoCr alloy were calculated. The change in the values is shown in FIG. 5. FIG. 5 shows that in the multilayer formed by using an alloy $Co_{0.8}Cr_{0.2}$ in which 20% of Cr was added to Co, the reflectivity in a normal incidence was remarkably improved. It is because the island-like deposition of Co thin layer was suppressed by adding Cr, and the roughness in the interfaces of the multilayer film was reduced. Though the reflectivity increases in accordance with rising of the concentration of Cr, it decreases from the time that the mole fraction exceeds 50%, due to the decreasing of concentration of Co, which is an advantage in the optical constant. In a multilayer film formed by using an alloy of which the mole fraction of Cr is over 70%, the reflectivity was as good as the Cr/C multilayer film. That is, the reflectivity was not improved.

Figure 6A:
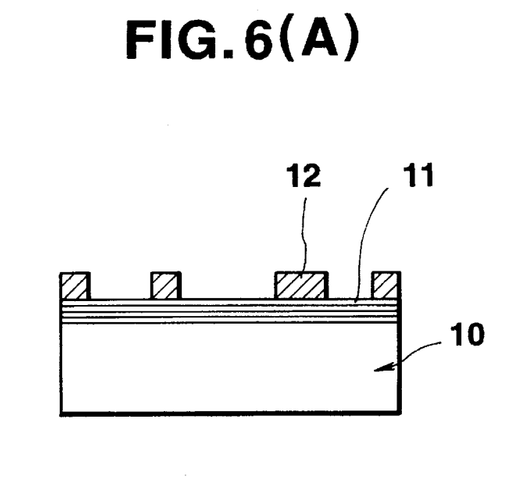
FIGS. 6A, 6B and 6C show reflection-type masks.
Figure 6B:
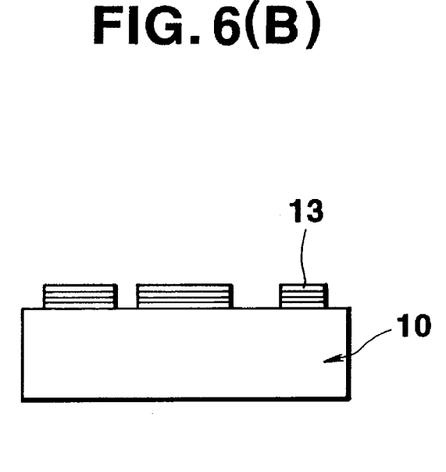
Figure 6C:
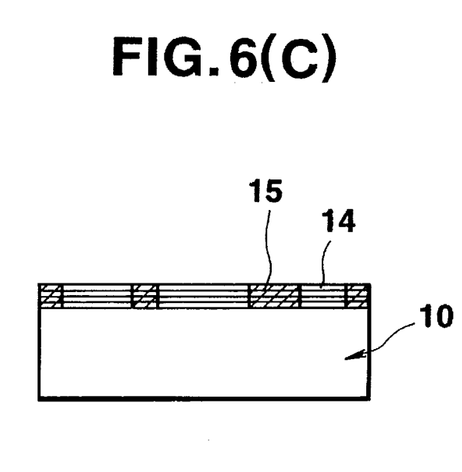

The above embodiment describes examples of the multilayer mirror for X-rays. However, the multilayer film of the present invention can be utilized also for reflection-type X-ray mask for lithography. FIG. 6 illustrates some examples of structures of the reflection-type X-ray mask.

FIG. 6(A) is the mask in which the above described reflection multilayer film 11 is provided on a substrate 10, and further on the multilayer film, pattern 12 is provided which is formed from X-ray absorption material.

In FIG. 6(B), a reflection pattern 13 of the multilayer film is directly formed on a substrate 10. In FIG. 6(C), non-reflective pattern 15 is formed by providing reflection multilayer film 14 on a substrate 10, then partially destroying the multilayer structure by irradiating an electron beam.

PREFERRED EMBODIMENT OF AN EXPOSURE APPARATUS

Figure 7:
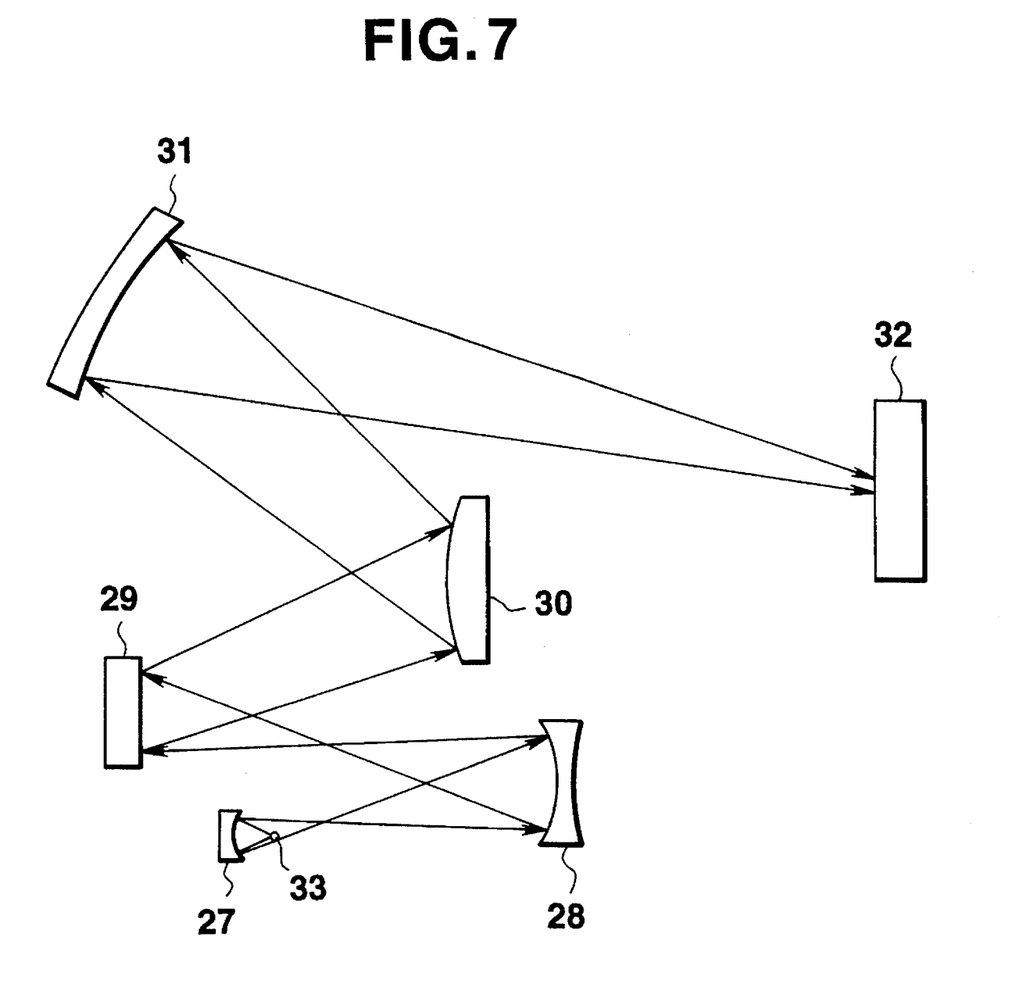
FIG. 7 is a structure of a reducing exposure apparatus.

FIG. 7 illustrates an example of a reducing exposure apparatus utilizing the above multilayer mirror or reflection-type mask. In the apparatus, a beam from laser plasma X-ray source 33 which generates soft X-rays of wavelength of 4.5 nm, is condensed by two reflection mirror 27, 28 having the above described layer structure, and light reflection mask 29 on which the above pattern is formed. The mask 29 has one of the structures described in FIG. 6. The soft X-rays reflected by reflection-type mask 29 is reduced by an imaging optical system consisting of two reflection mirrors 30, 31 having the above multilayer structure, projected to the resist coated on wafer 32. A mask pattern is then exposed and transferred. Where, reducing rate is one fifth, the number of openings is 0.02, and a Schwarzschild optical system is composed.

THE PREFERRED EMBODIMENT OF MANUFACTURING A DEVICE

An embodiment of the present invention applied to a manufacturing method of a semiconductor device utilizing an exposure apparatus according to one of the preceding embodiments, will now be explained.

Figure 8:
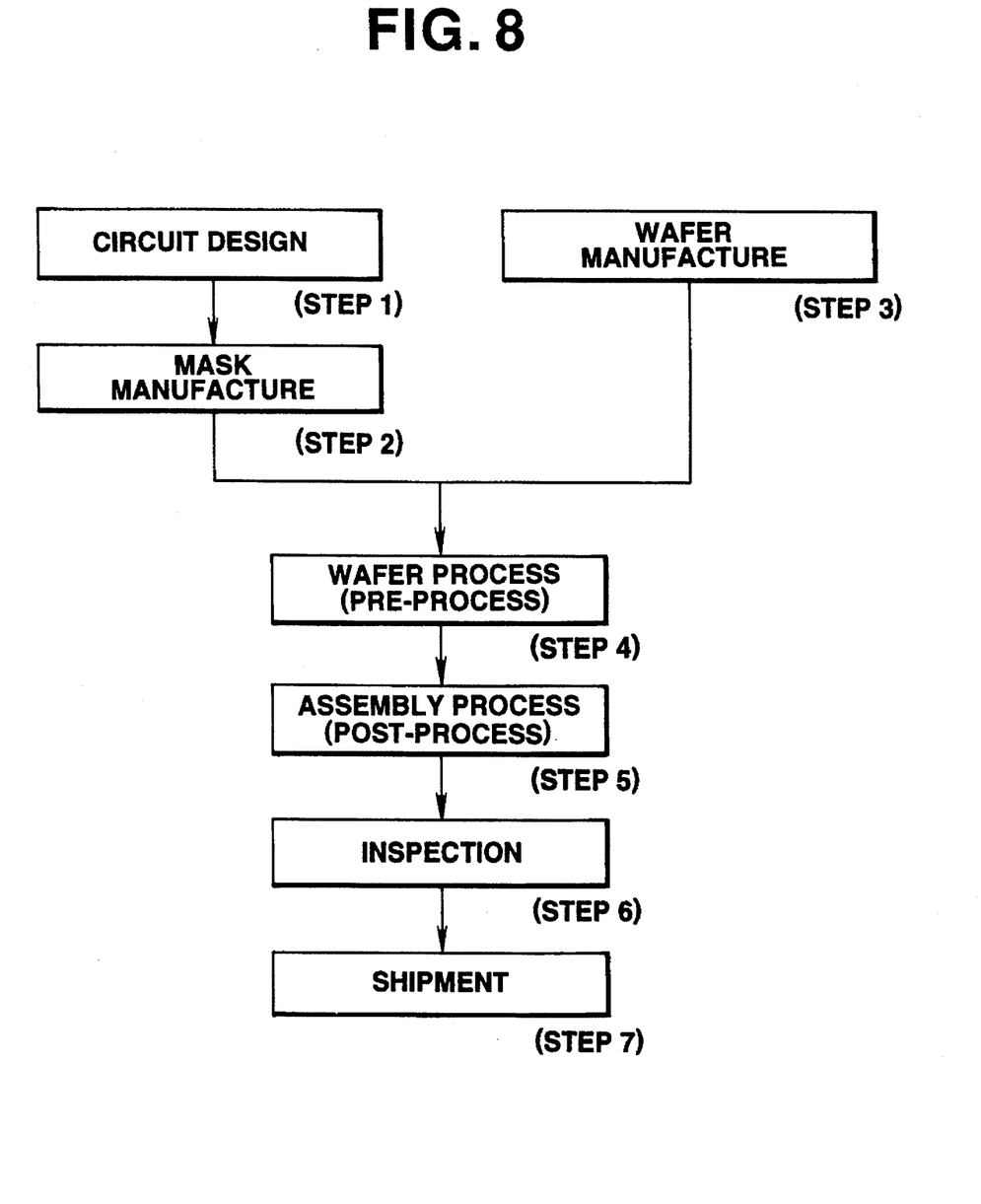
FIG. 8 is a flow chart of manufacturing a semiconductor device.

FIG. 8 is a flow chart of the sequence of manufacturing a semiconductor device such as a semiconductor chip i.e. IC or LSI, a liquid crystal panel or a CCD, for example. Step 1 is a design process for designing the circuit of a semiconductor device. Step 2 is a process for manufacturing a mask on the basis of the circuit pattern design. Step 3 is a process for manufacturing a wafer by using a material such as silicon.

Step 4 is a wafer process which is called a pre-process wherein, by using the prepared mask and wafer, circuits are formed on the wafer through lithography. Step 5 subsequent to this is an assembling step which is called a post-process wherein the wafer processed by step 4 is formed into semiconductor chips. This step includes assembling, i.e. dicing and bonding, and packaging i.e. chip sealing. Step 6 is an inspection step wherein operability check, durability check and so on of the semiconductor devices produced by step 5 are carried out. With these processes, semiconductor devices are finished and they are shipped Step 7.

Figure 9:
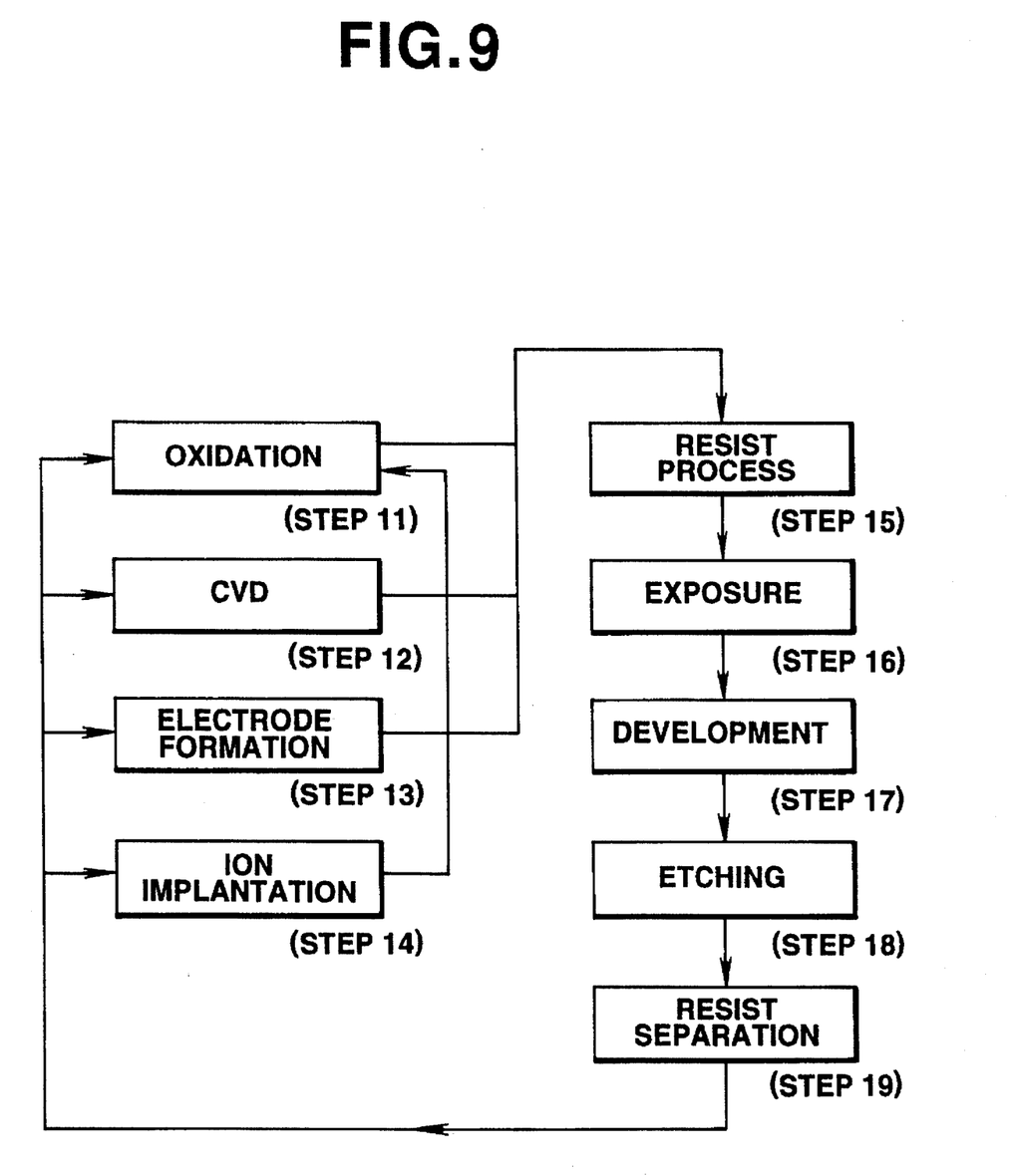
FIG. 9 is a detailed flow chart of a wafer process.

FIG. 9 is a flow chart showing details of the wafer process. Step 11 is an oxidation process for oxidizing the surface of a wafer. Step 12 is a CVD process for forming an insulating film on the wafer surface. Step 13 is an electrode forming process for forming electrodes on the wafer by vapor deposition. Step 14 is an ion implanting process for implanting ions to the wafer. Step 15 is a resist process for applying a resist which is a photosensitive material to the wafer. Step 16 is an exposure process for printing, by exposure, the circuit pattern of the mask on the wafer through the exposure apparatus described above. Step 17 is a developing process for developing the exposed wafer. Step 18 is an etching process for removing portions other than the developed resist image. Step 19 is a resist separation process for separating the resist material remaining on the wafer after being subjected to the etching process. By repeating these processes, circuit patterns are superposedly formed on the wafer.

While the invention has been described with reference to the structure disclosed herein, it is not confined to the details set forth and this application is intended to cover such modifications or changes as may come within the purpose of the improvements or the scope of the following claims.

What is claimed is:

1. A multilayer film for X-rays comprising:

a substrate; and first and second films formed alternately on said substrate;

wherein, one of the first and second films has a smaller refractive index than the other film, and consists of an alloy containing Co and Cr.

2. A multilayer film according to claim 1, wherein said alloy is represented by the formula: $Co_xCr_{1-x}$, where, x=0.3 to 0.8 mole fraction of Co.

3. A multilayer film according to claim 1, wherein the thickness of said film having the smaller refractive index is 30 Å or less.

4. A multilayer film according to claim 1, wherein one of said films having a greater refractive index contains an element selected from the group consisting of Ba, Mg, Be, Sb, V, Te, Sc, Ti, Ca, C, B, and Zr.

5. A multilayer film according to claim 1, wherein one of said film having the greater refractive index contains a material selected from the group consisting of V, Sc, $CaF_2$, and $B_4C$.

6. An optical element for X-rays, comprising:

a substrate; and a multilayer of first and second films formed alternately on said substrate, wherein, one of the first and second films has a smaller refractive index than the other film, and consists of an alloy containing Co and Cr.

7. An optical element according to claim 6, wherein the optical element is an X-ray reflection mirror.

8. An optical element according to claim 6, wherein the optical element is a reflection-type X-ray mask.

9. An optical element according to claim 6, wherein said alloy is composed of $Co_xC_{1-x}$, where, X=0.3–0.8 mole fraction of Co.

10. An optical element according to claim 6, wherein the thickness of said film having the smaller refractive index is 30 Å or less.

11. An optical element according to claim 6, wherein one of said films having a greater refractive index contains an element selected from the group consisting of Ba, Mg, Be, Sb, V, Te, Sc, Ti, Ca, C, B, and Zr.

12. An optical element according to claim 6, wherein one of said films having a greater refractive index contains a material selected from the group consisting of V, Sc, $CaF_2$, and $B_4C$.

13. An X-ray exposure apparatus comprising:

an optical system including an optical element for exposing an object with X-rays, said optical element comprises;

a substrate; and a multilayer of first and second films formed alternately on said substrate;

wherein, one of the first and second films has a smaller refractive index than the other film, and consists of an alloy containing Co and Cr.

14. An apparatus according to claim 13, wherein said object comprises a wafer, and a pattern printed onto the wafer by exposure.

15. An apparatus according to claim 13, wherein said alloy is composed of $Co_xCr_{1-x}$, where, X=0.3–0.8 mole fraction of Co.

16. An apparatus according to claim 13, wherein the thickness of said film having the smaller refractive index is 30 Å or less.

17. An apparatus according to claim 13, wherein one of said films which has a greater refractive index contains a material selected from the group consisting of Ba, Mg, Be, Sb, V, Te, Sc, Ti, Ca, C, B, and Zr.

18. An apparatus according to claim 13, wherein one of said films having the greater refractive index contains a material selected from the group consisting of V, Sc, $CaF_2$, and $B_4C$.

19. A method of manufacturing a mirco-device, comprising the steps of:

providing an X-ray optical system including an optical element;

said optical element being formed by forming a multilayer of first and second films alternately on said substrate, wherein one of the first and second films consists of an alloy containing Co and Cr;

providing a mask having a pattern and a wafer; and exposing the mask and the wafer to radiation to transfer the pattern of the mask onto the wafer by using said X-ray optical system.

20. An optical element, comprising:

a substrate; and a multilayer of first and second films formed alternately on said substrate;

wherein one of the first and second films has a smaller refractive index than the other film, and consists of an alloy containing Co and Cr.

* * * * *

UNITED STATES PATENT AND TRADEMARK OFFICE
CERTIFICATE OF CORRECTION

PATENT NO. : 5,528,654
DATED : June 18, 1996
INVENTOR(S) : MASAHITO NIIBE ET AL.                    Page 1 of 3

It is certified that error appears in the above-identified patent and that said Letters Patent is hereby corrected as shown below:

Title page,
AT [56] REFERENCES CITED

Other Publications,
    "vol. 1720," should read --Proc. SPIE, vol. 1720,--.

COLUMN 1

Line 24, "interfere" should read --interfere with--.
    Line 51, "films" should read --film--.
    Line 58, "reduced," should read --is reduced--.
    Line 66, "films" should read --film--.

COLUMN 2

Line 23, "a a" should read --a--.
    Line 24, "film" should read --films--.
    Line 52, "X" should read --x--.
    Line 67, "an" should read --a--.

COLUMN 3

Line 35, "layers i.e." should read --layers, i.e.--.

COLUMN 5

Line 63, "desolation" should read --isolation--.

UNITED STATES PATENT AND TRADEMARK OFFICE
CERTIFICATE OF CORRECTION

PATENT NO. : 5,528,654
DATED : June 18, 1996
INVENTOR(S) : MASAHITO NIIBE ET AL.      Page 2 of 3

It is certified that error appears in the above-identified patent and that said Letters Patent is hereby corrected as shown below:

COLUMN 6

Line 14, "monochromater." should read --monochromator.--.
       Line 53, "above described" should read
              --above-described--.

COLUMN 7

Line 3, "mirror 27, 28" should read --mirrors 27, 28--.
       Line 4, "above described" should read --above-described--.
       Line 7, "is" should read --are--.
       Line 11, "Where," should read --Where--.
       Line 23, "chip i.e." should read --chip, i.e.--.
       Line 34, "step 4" should read --Step 4--.
       Line 36, "packaging i.e." should read --packaging, i.e.--.
       Line 39, "step 5" should read --Step 5--.

UNITED STATES PATENT AND TRADEMARK OFFICE
CERTIFICATE OF CORRECTION

PATENT NO. : 5,528,654

DATED : June 18, 1996

INVENTOR(S) : MASAHITO NIIBE ET AL.

Page 3 of 3

It is certified that error appears in the above-identified patent and that said Letters Patent is hereby corrected as shown below:

COLUMN 8

Line 15, "film" should read --films--.
Line 31, "$Co_xC_{1-x}$," should read --$Co_xCr_{1-x}$,-- and "X=0.3-0.8" should read --x=0.3-0.8--.
Line 47, "prises;" should read --prises:--.
Line 59, "X=0.3-0.8" should read --x=0.3-0.8--.

Signed and Sealed this

Seventeenth Day of December, 1996

Attest:

BRUCE LEHMAN

Attesting Officer

Commissioner of Patents and Trademarks